US010248636B2

(12) United States Patent
Ito

(10) Patent No.: US 10,248,636 B2
(45) Date of Patent: Apr. 2, 2019

(54) ELECTRONIC DEVICE FOR CONTROLLING DELETION OF CHARACTER INPUT ON CHARACTER INPUT SCREEN, CHARACTER INPUT CONTROL METHOD FOR CONTROLLING DELETION OF CHARACTER INPUT ON CHARACTER INPUT SCREEN, AND STORAGE MEDIUM STORING THEREIN CHARACTER INPUT CONTROL METHOD PROGRAM

(71) Applicant: KYOCERA Document Solutions Inc., Osaka (JP)

(72) Inventor: Satoshi Ito, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 22 days.

(21) Appl. No.: 15/676,012

(22) Filed: Aug. 14, 2017

(65) Prior Publication Data
US 2018/0060288 A1   Mar. 1, 2018

(30) Foreign Application Priority Data
Aug. 25, 2016   (JP) .................................. 2016-164561

(51) Int. Cl.
*G06F 17/24*   (2006.01)
*G06F 3/023*   (2006.01)
(Continued)

(52) U.S. Cl.
CPC ............ *G06F 17/24* (2013.01); *G06F 3/0237* (2013.01); *G06F 3/0238* (2013.01);
(Continued)

(58) Field of Classification Search
CPC ..... G06F 17/24; G06F 17/2229; G06F 3/0238
(Continued)

(56) References Cited

U.S. PATENT DOCUMENTS 5,321,801 A * 6/1994 Ando .................. G06F 17/2863
345/157
7,149,970 B1 * 12/2006 Pratley .................. G06F 17/273
715/257

(Continued)

FOREIGN PATENT DOCUMENTS

JP   2010-146271 A   7/2010

OTHER PUBLICATIONS

How to Use the vi Editor; May 3, 2013; University of Washington; pp. 1-6.*

*Primary Examiner* — Andrew R Dyer
(74) *Attorney, Agent, or Firm* — Studebaker & Brackett PC

(57) ABSTRACT

An electronic device includes a display, an input device, and a controller. The display displays a character input screen. The input device includes character input keys, a character delete key, and a confirmation key. When the controller detects a character input key being pressed, the controller causes a character corresponding to the character input key to be displayed on the character input screen and determines whether or not any word registered in a word table is predictable from an unconfirmed character or a character string of unconfirmed characters input of which has not been confirmed through the confirmation key. In response to a single press on the character delete key, the controller deletes a deletion start character that makes word prediction impossible, or the deletion start character and at least one unconfirmed character immediately preceding or following the deletion start character.

15 Claims, 16 Drawing Sheets

(51) Int. Cl.
    *G06F 17/22* (2006.01)
    *G06F 17/27* (2006.01)
(52) U.S. Cl.
    CPC ...... *G06F 17/2223* (2013.01); *G06F 17/2229* (2013.01); *G06F 17/276* (2013.01)
(58) Field of Classification Search
    USPC .............................. 715/255, 256, 259, 261
    See application file for complete search history.

(56) References Cited

U.S. PATENT DOCUMENTS

| | | | |
|---|---|---|---|
| 9,182,831 B2* | 11/2015 | Xie | G06F 3/04883 |
| 9,659,002 B2* | 5/2017 | Medlock | G06F 17/276 |
| 2008/0316212 A1* | 12/2008 | Kushler | G06F 3/0482 |
| | | | 345/467 |
| 2011/0202836 A1* | 8/2011 | Badger | G06F 3/0237 |
| | | | 715/702 |

* cited by examiner

ELECTRONIC DEVICE FOR CONTROLLING DELETION OF CHARACTER INPUT ON CHARACTER INPUT SCREEN, CHARACTER INPUT CONTROL METHOD FOR CONTROLLING DELETION OF CHARACTER INPUT ON CHARACTER INPUT SCREEN, AND STORAGE MEDIUM STORING THEREIN CHARACTER INPUT CONTROL METHOD PROGRAM

INCORPORATION BY REFERENCE

The present application claims priority under 35 U.S.C. § 119 to Japanese Patent Application No. 2016-164561, filed on Aug. 25, 2016. The contents of this application are incorporated herein by reference in their entirety.

BACKGROUND

The present disclosure relates to an electronic device, a character input control method, and a storage medium.

In an electronic device such as a mobile terminal, characters that have been input can be deleted by a user character by character by pressing a character delete key. When the user wants to delete plural characters in such an electronic device, the user has to press the character delete key plural times. Therefore, there has been a problem that delete operation is annoying for the user. In order to solve this problem, a character processor varies the number of characters to be deleted depending on duration of pressing of the character delete key.

SUMMARY

The electronic device of the present disclosure includes a display, an input device, a storage, and a controller. The display displays a character input screen. The input device includes operation keys. The storage stores therein a word table in which a plurality of words are registered. The controller detects each of the operation keys being pressed. At least one character and a cursor are displayed on the character input screen. The operation keys include character input keys, a character delete key, and a confirmation key. Each of the at least one character is input through one of the character input keys. Any of the at least one character is deleted through the character delete key. Input of the at least one character is confirmed through the confirmation key. When the controller detects any of the character input keys being pressed, the controller causes a character corresponding to the pressed character input key to be displayed on the character input screen, and determines whether or not any word registered in the word table is predictable from an unconfirmed character or a character string of unconfirmed characters that is displayed on the character input screen and input of which has not been confirmed through the confirmation key. The controller stores in the storage an unconfirmed character that makes word prediction impossible as a deletion start character. The controller has a first deletion mode as a deletion mode in which at least one character displayed on the character input screen is deleted in response to a single press on the character delete key. In the first deletion mode, the controller deletes the deletion start character, or the deletion start character and at least one unconfirmed character immediately preceding or following the deletion start character.

A character input control method of the present disclosure includes displaying a character corresponding to a character input key and deleting at least one character displayed on a character input screen. In the displaying a character corresponding to a character input key, when a press on a character input key is detected, a character corresponding to the character input key is displayed at a position of a cursor displayed on a character input screen. In the deleting at least one character displayed on a character input screen, when a press on a character delete key is detected, at least one character displayed on the character input screen is deleted. The displaying a character corresponding to a character input key includes acquiring an unconfirmed character or a character string of unconfirmed characters, determining whether or not any word is predictable from the acquired unconfirmed character or the acquired character string, and storing in a storage an unconfirmed character that makes word prediction impossible as a deletion start character. In the acquiring an unconfirmed character or a character string of unconfirmed characters, when the character corresponding to the character input key is displayed on the character input screen, an unconfirmed character or a character string of unconfirmed characters is acquired from among at least one character displayed on the character input screen. Input of the unconfirmed character or the unconfirmed characters has not been confirmed through a confirmation key. In the determining whether or not any word is predictable from the acquired unconfirmed character or the acquired character string, whether or not any word is predictable from the acquired unconfirmed character or the acquired character string is determined. In the storing in a storage an unconfirmed character that makes word prediction impossible as a deletion start character, an unconfirmed character that makes word prediction impossible is stored in a storage as a deletion start character. The deleting at least one character displayed on a character input screen includes deleting the at least one character in a first deletion mode. In the first deletion mode, the deletion start character is deleted or the deletion start character and at least one unconfirmed character immediately preceding or following the deletion start character are deleted.

A non-transitory computer readable storage medium of the present disclosure stores therein a character input control program to be executed by a computer to perform the above-described character input control method.

DETAILED DESCRIPTION

Figure 1:
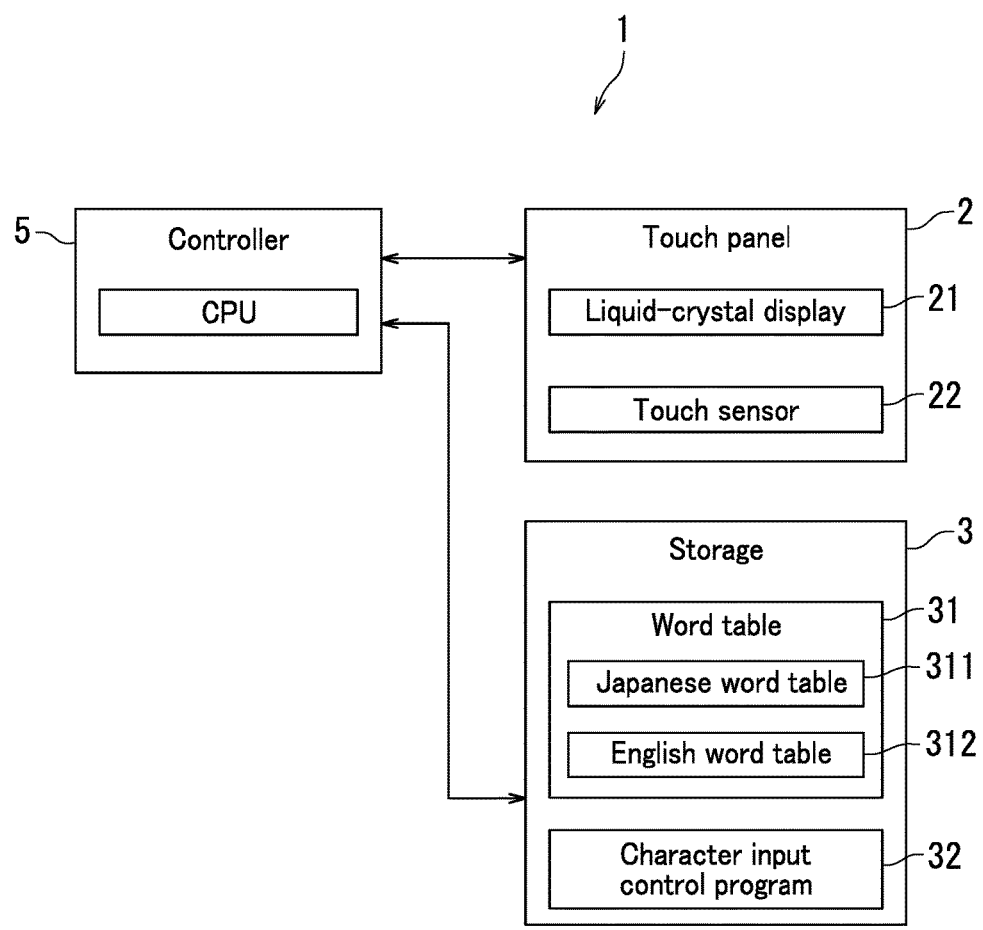
FIG. 1 is a diagram illustrating a configuration of an electronic device according to a first embodiment of the present disclosure.

The following describes embodiments of an electronic device, a character input control method, and a storage medium according to the present disclosure. Note that in the drawings, elements that are the same or substantially equivalent are labelled using the same reference signs and explanation of which will not be repeated. Also, the drawings schematically illustrate elements of configuration in order to facilitate understanding.

First Embodiment

First, a configuration of an electronic device 1 according to a first embodiment will be described with reference to FIG. 1. FIG. 1 is a diagram illustrating the configuration of the electronic device 1 according to the first embodiment. The electronic device 1 in the present embodiment is a portable information terminal device.

As illustrated in FIG. 1, the electronic device 1 includes a touch panel 2, a storage 3, and a controller 5.

The touch panel 2 includes a liquid-crystal display 21 and a touch sensor 22. The liquid-crystal display 21 is an example of a display. The touch sensor 22 is an example of an input device.

The liquid-crystal display 21 has a display surface. The liquid-crystal display 21 displays on the display surface for example an operation screen for operating the electronic device 1. In the present embodiment, the liquid-crystal display 21 displays a character input screen on the display surface. Various buttons are displayed on the character input screen.

The touch sensor 22 has a touch surface. In the present embodiment, the touch surface is located above the display surface. Upon detecting the touch surface being pressed, the touch sensor 22 generates a signal indicating a pressed position. The signal indicating the pressed position is sent to the controller 5. The controller 5 determines a button corresponding to the position indicated by the received signal from among buttons displayed on the display surface. Through the above, the controller 5 can acquire information indicating a button pressed by a user. In the present embodiment, the touch sensor 22 is a touch sensor of a resistive film method. Note that the touch sensor 22 may be a touch sensor of an electrostatic capacitance method.

The storage 3 includes a hard disk drive (HDD), a random access memory (RAM) device, a read only memory (ROM) device, and the like. The storage 3 stores therein control programs for controlling operation of the electronic device 1. Note that the storage 3 may include a solid state drive (SSD) instead of the HDD.

The storage 3 stores therein a character input control program 32. In the present embodiment, the character input control program 32 is a Japanese language input program. The Japanese language input program includes a "Roman character input mode" and an "alphanumeric character input mode" as character input modes. A user can select either of the "Roman character input mode" and the "alphanumeric character input mode" as a character input mode.

The storage 3 stores therein a word table 31. A plurality of words are registered in the word table 31. The word table 31 includes a Japanese word table 311 and an English word table 312. For example, a word "sakujo" is registered in the Japanese word table 311. For example, a word "Delete" is registered in the English word table 312. In the present embodiment, the controller 5 refers to the Japanese word table 311 when the Roman character input mode is selected, and refers to the English word table 312 when the alphanumeric character input mode is selected.

The controller 5 includes a central processing unit (CPU) or the like. The controller 5 controls operation of various sections of the electronic device 1 through execution of the control programs stored in the storage 3. In the present embodiment, the controller 5 executes character input control processing through execution of the character input control program 32 stored in the storage 3. Upon execution of the character input control processing, a character input screen is displayed on the display surface.

Figure 2A:
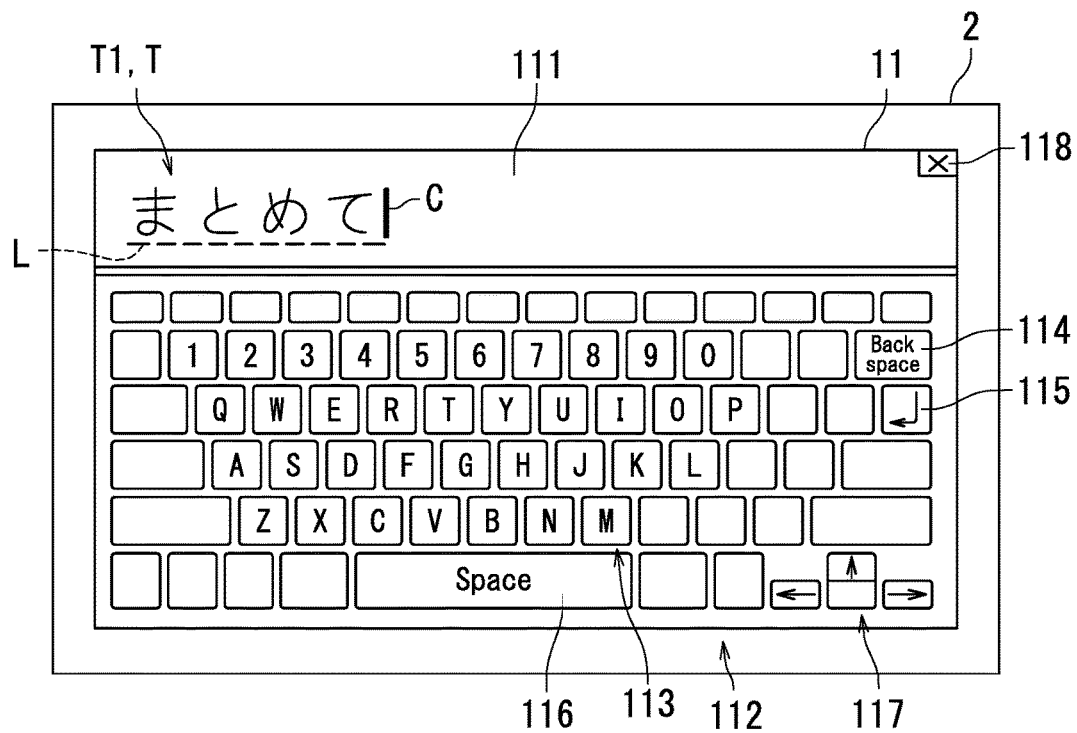
FIG. 2A is a diagram illustrating an example of a character input screen according to the first embodiment of the present disclosure.
Figure 2B:
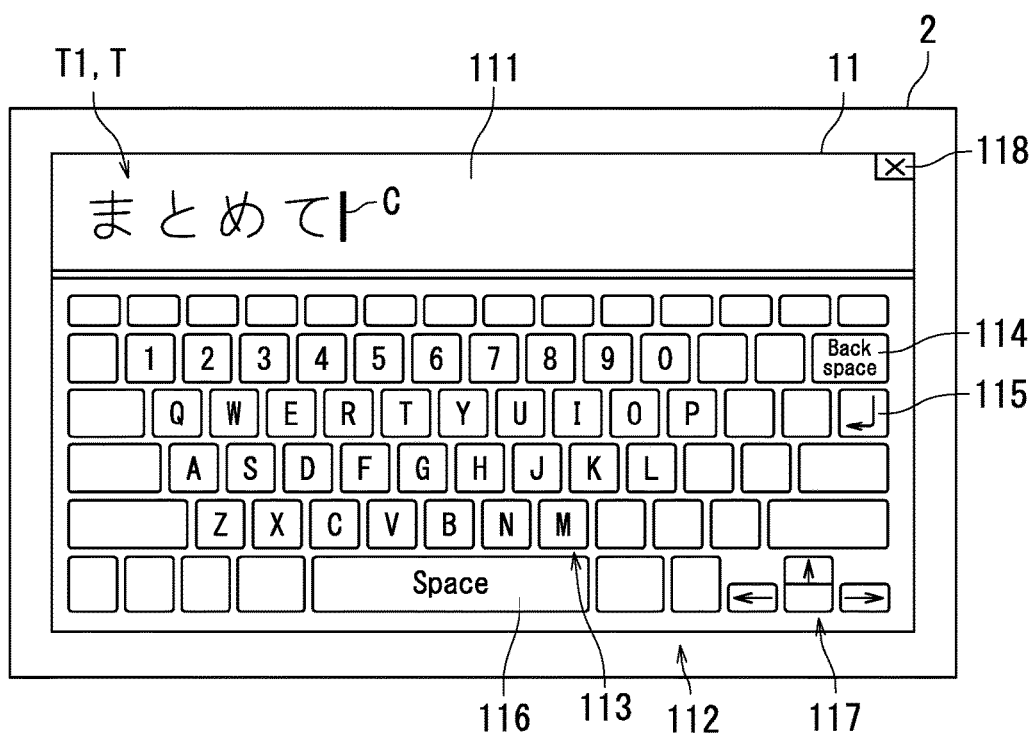
FIG. 2B is a diagram illustrating the character input screen displayed after a confirmation key has been pressed in a state illustrated in FIG. 2A.

Next, a character input screen 11 according to the first embodiment will be described with reference to FIGS. 1, 2A, and 2B. FIG. 2A is a diagram illustrating an example of the character input screen 11 according to the first embodiment. FIG. 2B is a diagram illustrating the character input screen 11 displayed after a confirmation key has been pressed in a state illustrated in FIG. 2A.

As illustrated in FIG. 2A, the character input screen 11 is displayed on the touch panel 2. Specifically, the character input screen 11 is displayed on the display surface of the liquid-crystal display 21.

The character input screen 11 includes a character display field 111. The character input screen 11 also includes various buttons. In the present embodiment, the buttons include operation keys 112 and an end button 118. The operation keys 112 include a plurality of character input keys 113, a character delete key 114, a confirmation key 115, a conversion key 116, and arrow keys 117. In the present embodiment, the plurality of character input keys 113 correspond to alphabetic characters "A" to "Z" and numerical characters "0" to "9". The character delete key 114 is a "Back space key". The confirmation key 115 is an "Enter key". The conversion key 116 is a "Space key".

Display of the character input screen 11 ends when the end button 118 is pressed.

A cursor C is displayed in the character display field 111. Also, a character corresponding to a character input key 113 that has been pressed by a user is displayed in the character display field 111. Specifically, when any of the character input keys 113 is pressed by a user, the touch sensor 22 sends a signal indicating a pressed position to the controller 5. Upon receiving the signal indicating the pressed position, the controller 5 acquires information indicating a character input key 113 that has been pressed and acquires a character corresponding to the pressed character input key 113. The controller 5 causes the acquired character to be displayed as a character T at a position of the cursor C. The cursor C moves to the rear of the displayed character T.

In a situation in which the Roman character input mode is selected as the character input mode, when a character input key 113 is pressed according to a system for writing Japanese in Romaji (Roman characters), a kana character (in the example illustrated in FIG. 2A, a hiragana character) corresponding to the pressed character input key 113 is displayed as the character T in the character display field 111. In a situation in which the alphanumeric character input mode is selected as the character input mode, any of the alphabetic characters "A" to "Z" and numerical characters "0" to "9" corresponding to a pressed character input key 113 is displayed as the character T in the character display field 111.

The character T displayed in the character display field 111 is deleted when the character delete key 114 is pressed. In the present embodiment, at least one character T preceding the cursor C is deleted.

The controller 5 causes a dash line L to be displayed under an unconfirmed character T. The term "unconfirmed character T" refers to a character T input of which has not been confirmed. Input of the unconfirmed character T is confirmed when the controller 5 detects the confirmation key 115 being pressed. For example, in a situation in which the unconfirmed character T is a kana character, the unconfirmed character T may be converted to a Chinese character. Conversion of the unconfirmed character T to a Chinese character or the like is executed when the controller 5 detects the conversion key 116 being pressed.

In the example illustrated in FIG. 2A, four kana characters T1 "ま", "と", "あ", and "て" are displayed in the character display field 111. The cursor C is displayed next to the last input character "て". In other words, the cursor C is displayed at the end of a character string made up of the four kana characters T1. Also, a dash line L is displayed under the four kana characters T1 "ま", "と", "あ", and "て". That is, the four kana characters T1 "ま", "と", "あ", and "て" are unconfirmed characters T. Note that the cursor C moves in response to any of the arrow keys 117 being pressed.

When the controller 5 detects the confirmation key 115 being pressed in the state illustrated in FIG. 2A, the dash line L displayed under the four kana characters T1 "ま", "と", "あ", and "て" disappears as illustrated in FIG. 2B. Through the above, a user recognizes that input of the four unconfirmed kana characters T1 "ま", "と", "あ", and "て" has been confirmed.

Figure 3:
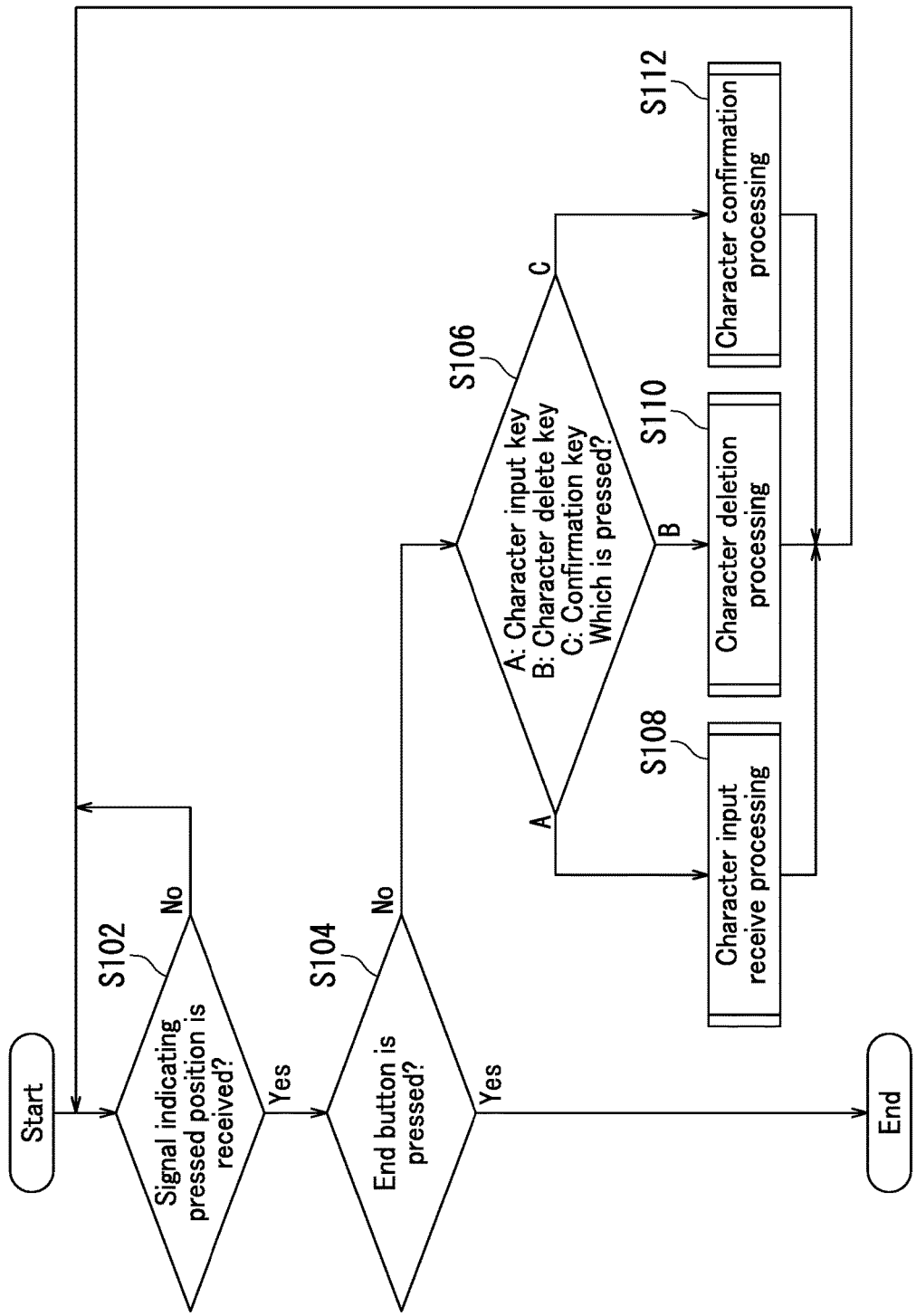
FIG. 3 is a flowchart illustrating character input control processing according to the first embodiment of the present disclosure.

Next, character input control processing according to the first embodiment will be described with reference to FIGS. 1 to 3. FIG. 3 is a flowchart illustrating the character input control processing according to the first embodiment. The character input control processing starts when the character input screen 11 is displayed on the display surface.

As illustrated in FIG. 3, the controller 5 determines whether or not a signal indicating a pressed position has been received from the touch sensor 22 (step S102). When the controller 5 determines that no signal indicating a pressed position has been received (step S102: No), the character input control processing returns to step S102. By contrast, when the controller 5 determines that a signal indicating a pressed position has been received (step S102: Yes), the controller 5 determines whether or not the end button 118 has been pressed (step S104). When the controller 5 determines that the end button 118 has not been pressed (step S104: No), the controller 5 determines which of the character input keys 113, the character delete key 114, and the confirmation key 115 has been pressed (step S106).

When the controller 5 determines that a character input key 113 has been pressed (step S106: A), the controller 5 executes character input receive processing (step S108). Specifically, the controller 5 causes a character corresponding to the pressed character input key 113 to be displayed in the character display field 111. When the controller 5 determines that the character delete key 114 has been pressed (step S106: B), the controller 5 executes character deletion processing (step S110). Specifically, the controller 5 deletes at least one character displayed in the character display field 111. When the controller 5 determines that the confirmation key 115 has been pressed (step S106: C), the controller 5 executes character confirmation processing (step S112). Specifically, the controller 5 confirms input of at least one unconfirmed character T.

When any of steps S108, S110, and S112 has been executed, the character input control processing returns to step S102.

When the controller 5 determines at step S104 that the end button 118 has been pressed (step S104: Yes), the character input control processing ends. Note that in the present embodiment, displaying a character corresponding to a pressed character input key at a position of a cursor displayed on a character input screen is performed by the character input receive processing and deleting at least one character displayed on the character input screen is performed by the character deletion processing.

Next, the character input receive processing (step S108 in FIG. 3) according to the first embodiment will be described with reference to FIGS. 1 and 4A to 6. An example illustrated in FIGS. 4A, 4B, and 5 will be described on the assumption that a word predictable from the alphabetic character "D", specifically, the word "Delete" is registered in the word table 31 and no word predictable from a character string "Deletes" is registered in the word table 31.

Figure 4A:
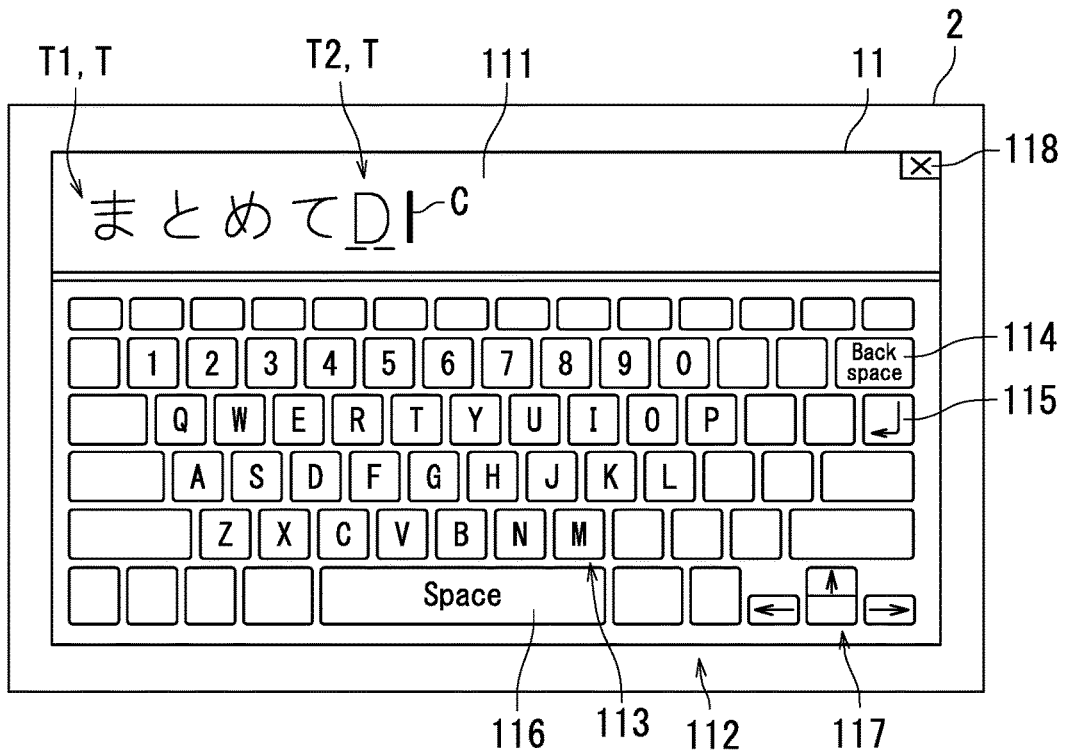
FIG. 4A is a diagram illustrating the character input screen displayed after a character input key has been pressed in a state illustrated in FIG. 2B.

FIG. 4A is a diagram illustrating the character input screen 11 displayed after a character input key 113 has been pressed in the state illustrated in FIG. 2B. Specifically, FIG. 4A illustrates the character input screen 11 displayed after a character input key 113 corresponding to the alphabetic character "D" has been pressed in the state illustrated in FIG. 2B. Note that in the example illustrated in FIG. 4A, the character input mode has been switched from the "Roman character input mode" to the "alphanumeric character input mode" just before the character input key 113 corresponding to the alphabetic character "D" has been pressed. That is, in the example illustrated in FIGS. 4A, 4B, and 5, the controller 5 refers to the English word table 312.

As illustrated in FIG. 4A, four kana characters T1 "ま", "と", "め", and "て" and an alphabetic character T2 "D" are displayed in the character display field 111. In the example illustrated in FIG. 4A, input of the four kana characters T1 "ま", "と", "め", and "て" has been confirmed and input of the alphabetic character T2 "D" has not been confirmed. Therefore, the controller 5 acquires "D" as an unconfirmed character T.

The controller 5 determines whether or not any word registered in the English word table 312 is predictable from the acquired character T "D". Specifically, the controller 5 searches the English word table 312 for words starting from the acquired character T "D". As described above, the word "Delete" is registered in the English word table 312. The word "Delete" is predictable from the acquired character T "D". Therefore, the controller 5 determines that the word registered in the English word table 312 is predictable from the acquired character T "D".

Figure 4B:
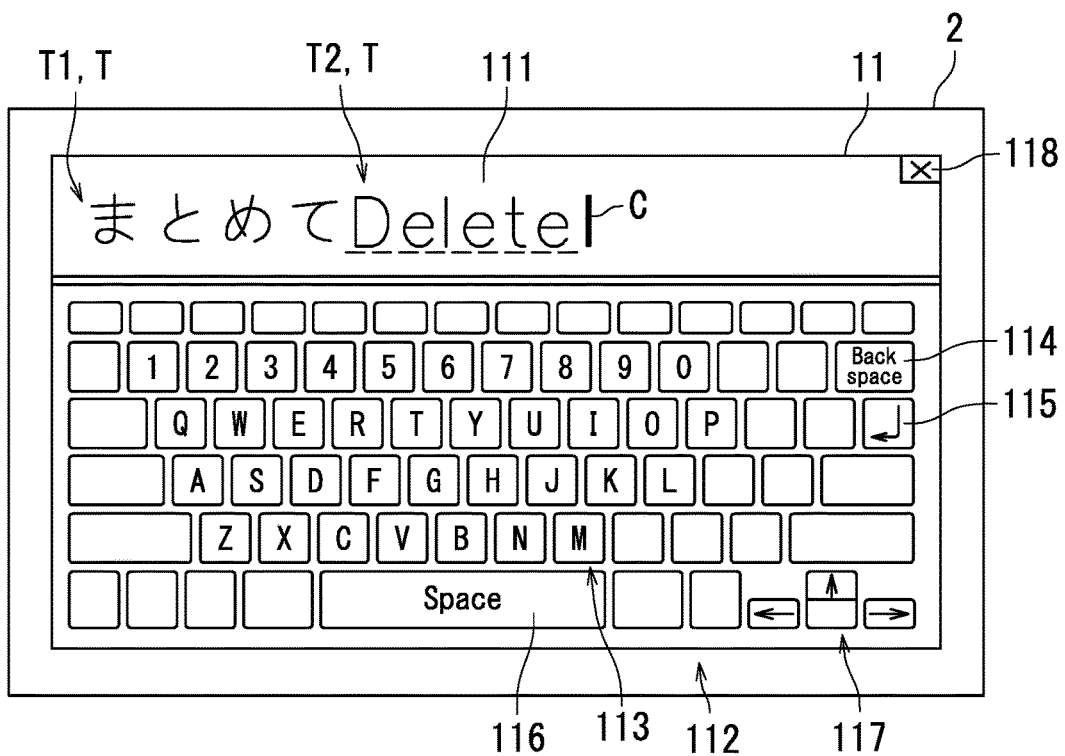
FIG. 4B is a diagram illustrating the character input screen displayed after character input keys have been successively pressed in a state illustrated in FIG. 4A.

FIG. 4B is a diagram illustrating the character input screen 11 displayed after character input keys 113 have been successively pressed in the state illustrated in FIG. 4A. Specifically, FIG. 4B illustrates the character input screen 11 displayed after character input keys 113 corresponding to the alphabetic characters "e", "l", "e", "t", and "e" have been successively pressed in the state illustrated in FIG. 4A.

As illustrated in FIG. 4B, the four kana characters T1 "ま", "と", "め", and "て" and six alphabetic characters T2 "D", "e", "l", "e", "t", and "e" are displayed in the character display field 111. In the example illustrated in FIG. 4B, input of the four kana characters T1 "ま", "と", "め", and "て" has been confirmed and input of the six alphabetic characters T2 "D", "e", "l", "e", "t", and "e" has not been confirmed. Therefore, the controller 5 acquires "D", "e", "l", "e", "t", and "e" as unconfirmed characters T.

The controller 5 determines whether or not any word registered in the English word table 312 is predictable from a character string "Delete" made up of the six acquired characters T "D", "e", "l", "e", "t", and "e". Specifically, the controller 5 searches the English word table 312 for words starting from the character string "Delete" made up of the acquired characters T. As described above, the word "Delete" is registered in the English word table 312. In other words, the word "Delete" is predictable from the character string "Delete" made up of the acquired characters T. Therefore, the controller 5 determines that the word registered in the English word table 312 is predictable from the plural acquired characters T "D", "e", "l", "e", "t", and "e".

Figure 5:
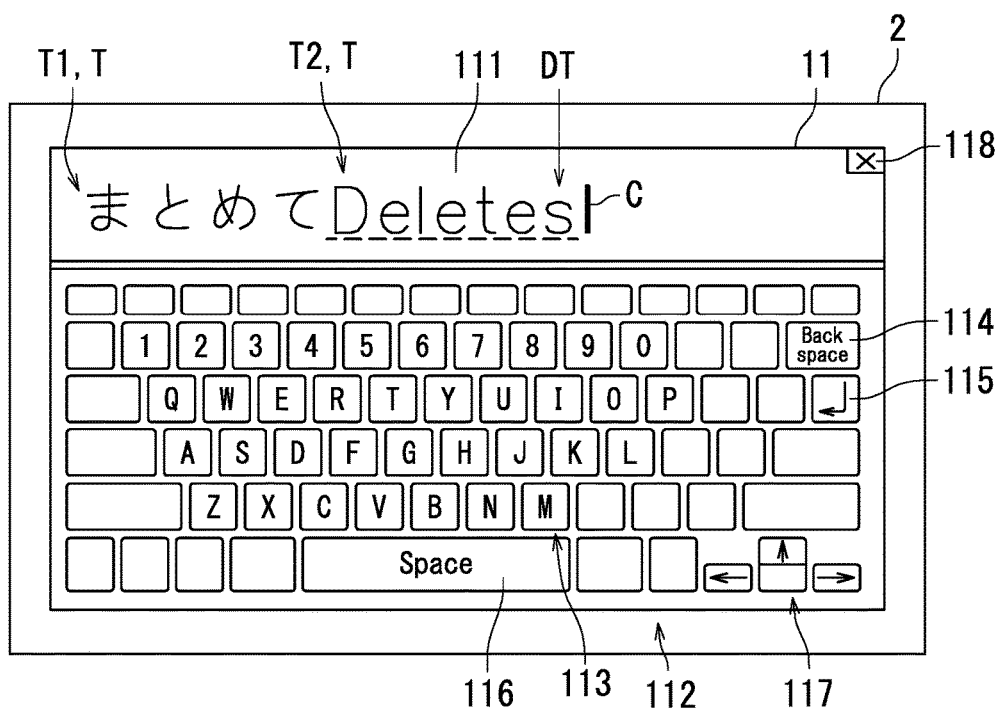
FIG. 5 is a diagram illustrating the character input screen displayed after a character input key has been pressed in a state illustrated in FIG. 4B.

FIG. 5 is a diagram illustrating the character input screen 11 displayed after a character input key 113 has been pressed in the state illustrated in FIG. 4B. Specifically, FIG. 5 illustrates the character input screen 11 displayed after a character input key 113 corresponding to the alphabetic character "s" has been pressed in the state illustrated in FIG. 4B.

As illustrated in FIG. 5, the four kana characters T1 "ま", "と", "め", and "て" and seven alphabetic characters T2 "D", "e", "l", "e", "t", "e", and "s" are displayed in the character display field 111. In the example illustrated in FIG. 5, input of the four kana characters T1 "ま", "と", "め", and "て" has been confirmed and input of the seven alphabetic characters T2 "D", "e", "l", "e", "t", "e", and "s" has not been confirmed. Therefore, the controller 5 acquires "D", "e", "l", "e", "t", "e", and "s" as unconfirmed characters T.

The controller 5 determines whether or not any word registered in the English word table 312 is predictable from a character string "Deletes" made up of the unconfirmed characters T "D", "e", "l", "e", "t", "e", and "s". Specifically, the controller 5 searches the English word table 312 for words starting from the character string "Deletes" made up of the acquired characters T. As described above, no word predictable from the character string "Deletes" is registered in the English word table 312. Therefore, it is impossible to predict any word registered in the English word table 312 from the character string made up of the acquired characters T. That is, the unconfirmed character T "s" makes word prediction impossible. The controller 5 stores in the storage 3 the unconfirmed character T "s" as a deletion start character DT. Note that the deletion start character DT is erased from the storage 3 when input of the unconfirmed character T determined to be the deletion start character DT is confirmed.

Figure 6:
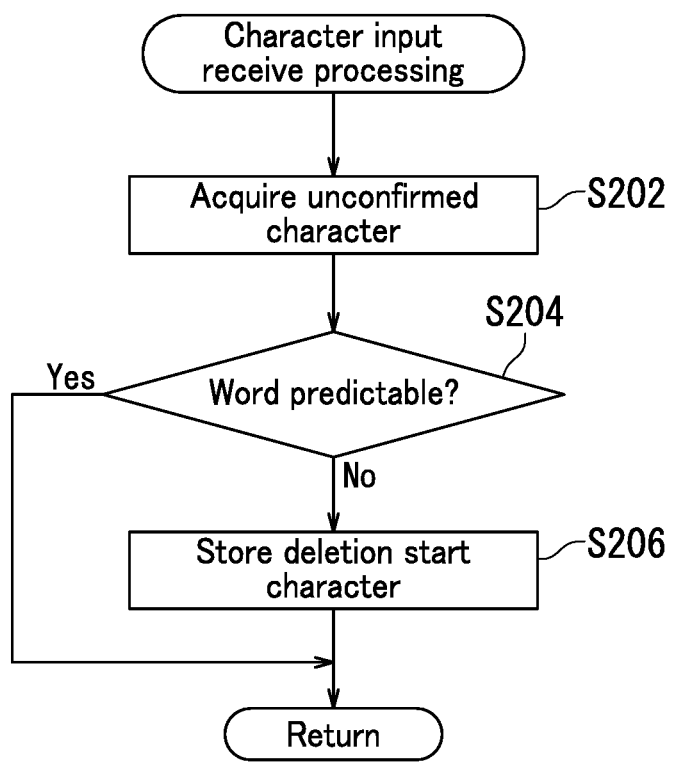
FIG. 6 is a flowchart illustrating character input receive processing according to the first embodiment of the present disclosure.

FIG. 6 is a flowchart illustrating the character input receive processing according to the first embodiment. The character input receive processing is executed when a character T corresponding to a pressed character input key 113 is displayed in the character display field 111. In other words, the character input receive processing is executed when the controller 5 detects any of the character input keys 113 being pressed (step S106: A in FIG. 3).

As illustrated in FIG. 6, when a character T corresponding to a pressed character input key 113 is displayed in the character display field 111, the controller 5 executes unconfirmed character acquisition processing (step S202). Specifically, the controller 5 acquires an unconfirmed character T or unconfirmed characters T from among at least one character T displayed in the character display field 111.

After acquiring the unconfirmed character(s) T, the controller 5 executes word determination processing. Specifically, the controller 5 determines whether or not any word registered in the word table 31 is predictable from the unconfirmed character(s) T (step S204). When the controller 5 determines that a word registered in the word table 31 is predictable from the unconfirmed character(s) T (step S204: Yes), the controller 5 ends the character input receive processing and returns to step S102 in FIG. 3. By contrast, when the controller 5 determines that no word registered in the word table 31 is predictable from the unconfirmed character(s) T (step S204: No), the controller 5 executes deletion-start-character storage processing. Specifically, the controller 5 stores in the storage 3 the character T corresponding to the pressed character input key 113 as a deletion start character DT (step S206). After storing in the storage 3 the character T corresponding to the pressed character input key 113 as the deletion start character DT, the controller 5 ends the character input receive processing and returns to step S102 in FIG. 3.

Note that in the present embodiment, acquiring an unconfirmed character or a character string of unconfirmed characters input of which has not been confirmed through the confirmation key is performed by the unconfirmed character acquisition processing, determining whether or not any word is predictable from the acquired character or the acquired character string is performed by the word determination processing, and storing in the storage an unconfirmed character that makes word prediction impossible as a deletion start character is performed by the deletion-start-character storage processing.

Next, the character deletion processing (step S110 in FIG. 3) according to the first embodiment will be described with reference to FIGS. 1, 7A, 7B, and 8. In the present embodiment, the controller 5 executes the character deletion processing in a first deletion mode. In the following description, the character deletion processing in the first deletion mode may be referred to as "first deletion processing". In the first deletion processing, all unconfirmed characters T following a deletion start character DT are deleted.

Figure 7A:
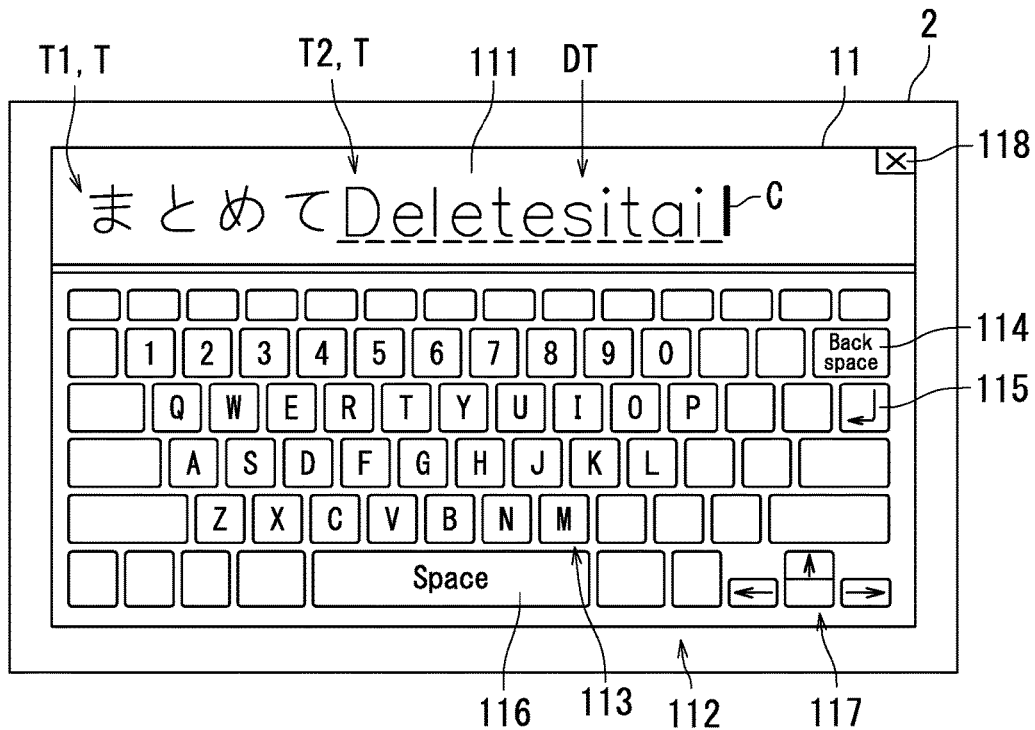
FIG. 7A is a diagram illustrating the character input screen displayed after character input keys have been successively pressed in a state illustrated in FIG. 5.
Figure 7B:
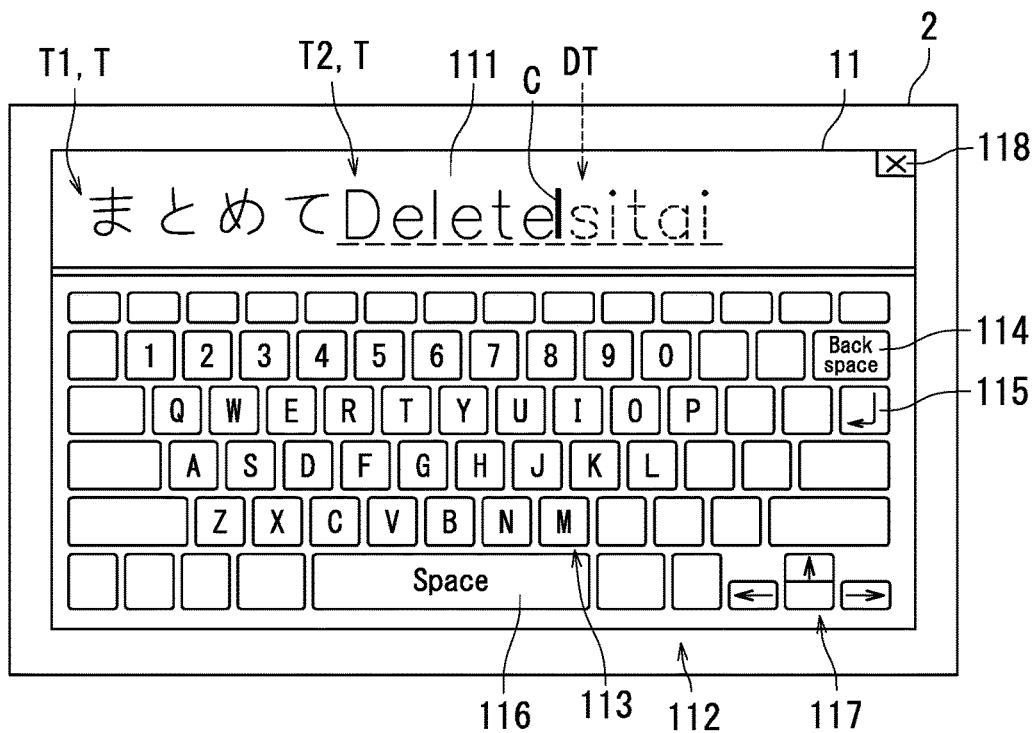
FIG. 7B is a diagram illustrating the character input screen displayed after a character delete key has been pressed in a state illustrated in FIG. 7A.

FIG. 7A is a diagram illustrating the character input screen 11 displayed after character input keys 113 have been successively pressed in the state illustrated in FIG. 5. Specifically, FIG. 7A illustrates the character input screen 11 displayed after character input keys 113 corresponding to the alphabetic characters "i", "t", "a", and "i" have been successively pressed in the state illustrated in FIG. 5. FIG. 7B is a diagram illustrating the character input screen 11 displayed after the character delete key 114 has been pressed in the state illustrated in FIG. 7A. The example illustrated in FIGS. 7A and 7B will be described on the assumption that an unconfirmed character T "s" is stored in the storage 3 as a deletion start character DT.

As illustrated in FIG. 7A, four kana characters T1 "ま", "と", "め", and "て" and plural alphabetic characters T2 "D", "e", "l", "e", "t", "e", "s", "i", "t", "a", and "i" are displayed in the character display field 111. In the example illustrated in FIG. 7A, input of the four kana characters T1 "ま", "と", "め", and "て" has been confirmed and input of the plural alphabetic characters T2 "D", "e", "l", "e", "t", "e", "s", "i", "t", "a", and "i" has not been confirmed.

The cursor C is located at the end of a character string "Deletesitai" made up of the plural unconfirmed characters T.

When the character delete key 114 is pressed, the controller 5 acquires the position of the cursor C. In the present embodiment, the controller 5 determines whether or not the cursor C is located in an unconfirmed area. The term "unconfirmed area" refers to an area in which a character string made up of unconfirmed characters T is displayed.

When the controller 5 determines that the cursor C is located in an unconfirmed area, the controller 5 reads the deletion start character DT stored in the storage 3 and determines whether or not the cursor C is located in the rear of the deletion start character DT. When the controller 5 determines that the cursor C is located in the rear of the deletion start character DT, the controller 5 deletes the deletion start character DT and any unconfirmed characters T following the deletion start character DT. In the example illustrated in FIGS. 7A and 7B, the unconfirmed character T "s" is the deletion start character DT. Therefore, as indicated by dash lines in FIG. 7B, plural alphabetic characters T2 "s", "i", "t", "a", and "i" are deleted.

Figure 8:
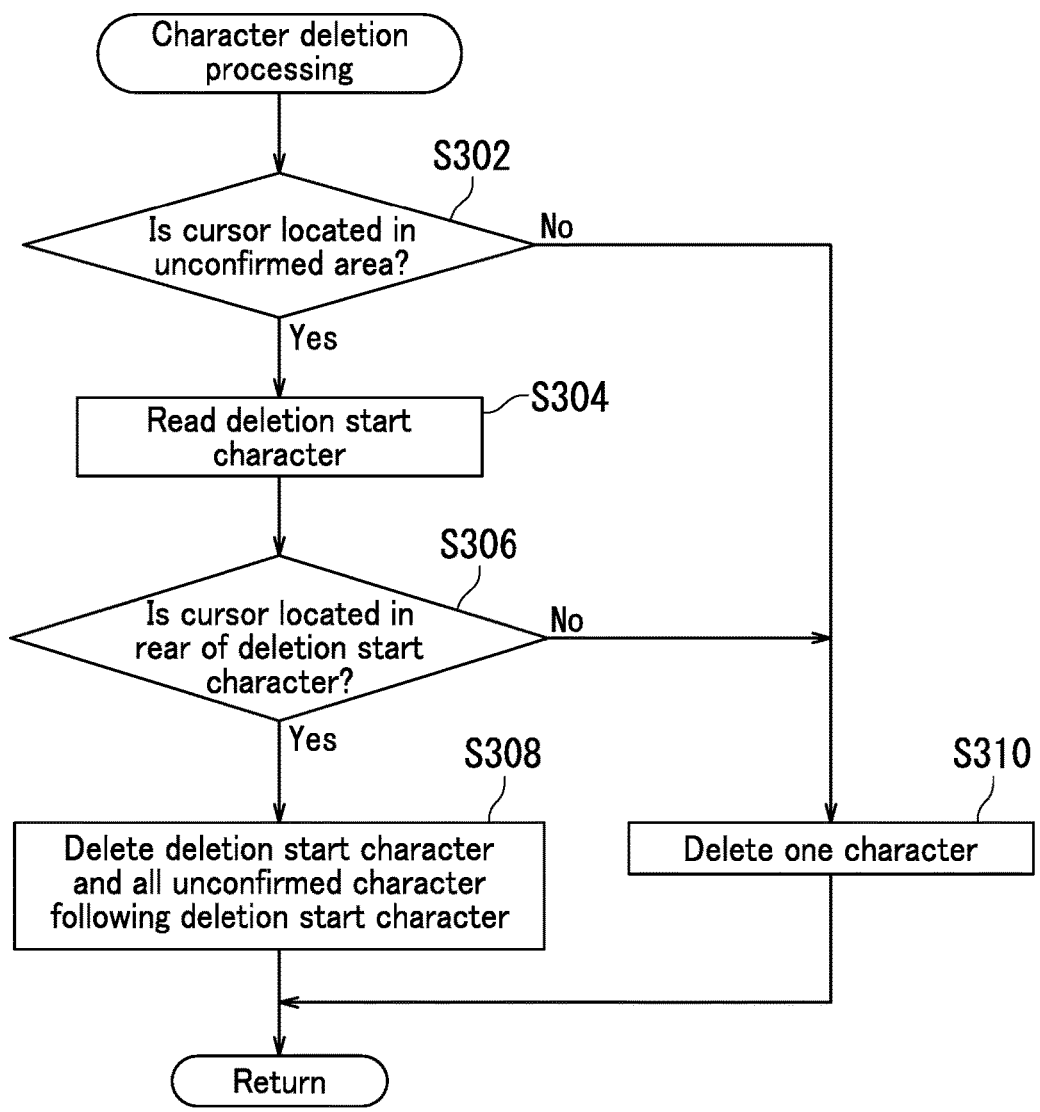
FIG. 8 is a flowchart illustrating character deletion processing according to the first embodiment of the present disclosure.

FIG. 8 is a flowchart illustrating the character deletion processing according to the first embodiment. The character deletion processing is started when the controller 5 detects the character delete key 114 being pressed (step S106: B in FIG. 3).

As illustrated in FIG. 8, the controller 5 acquires a position of the cursor C and determines whether or not the cursor C is located in an unconfirmed area (step S302). When the controller 5 determines that the cursor C is located in an unconfirmed area (step S302: Yes), the controller 5 reads a deletion start character DT stored in the storage 3 (step S304). Next, the controller 5 determines whether or not the cursor C is located in the rear of the deletion start character DT (step S306). When the controller 5 determines that the cursor C is located in the rear of the deletion start character DT (step S306: Yes), the deletion start character DT and any unconfirmed characters T following the deletion start character DT are all deleted (step S308). Through the above, the controller 5 ends the character deletion processing and returns to step S102 in FIG. 3. By contrast, when the controller 5 determines that the cursor C is not located in an unconfirmed area (step S302: No) or the cursor C is not located in the rear of a deletion start character (step S306: No), a character T immediately preceding the cursor C is deleted (step S310). Through the above, the controller 5 ends the character deletion processing and returns to step S102 in FIG. 3.

Through the above, the first embodiment has been described. When no word is predictable from a character or characters input to the character display field 111, it is highly likely that the character(s) has/have been incorrectly input. According to the present embodiment, when any of the character input keys 113 is pressed, it is determined whether or not any word is predictable from an unconfirmed character T or a character string made up of unconfirmed characters T. Further, an unconfirmed character T (deletion start character DT) that makes word prediction impossible and all unconfirmed characters T following the deletion start character DT are deleted. Therefore, a character or characters that a user wants to delete can be deleted efficiently.

The present embodiment has been described about an example in which the deletion start character DT and all unconfirmed characters T following the deletion start character DT are deleted. However, for example, the deletion start character DT and all unconfirmed characters T interposed between the deletion start character DT and the cursor C may be deleted.

Further, although the present embodiment has been described about an example in which the alphanumeric character input mode is selected as the character input mode, the Roman character input mode may be selected as the character input mode.

Figure 9A:
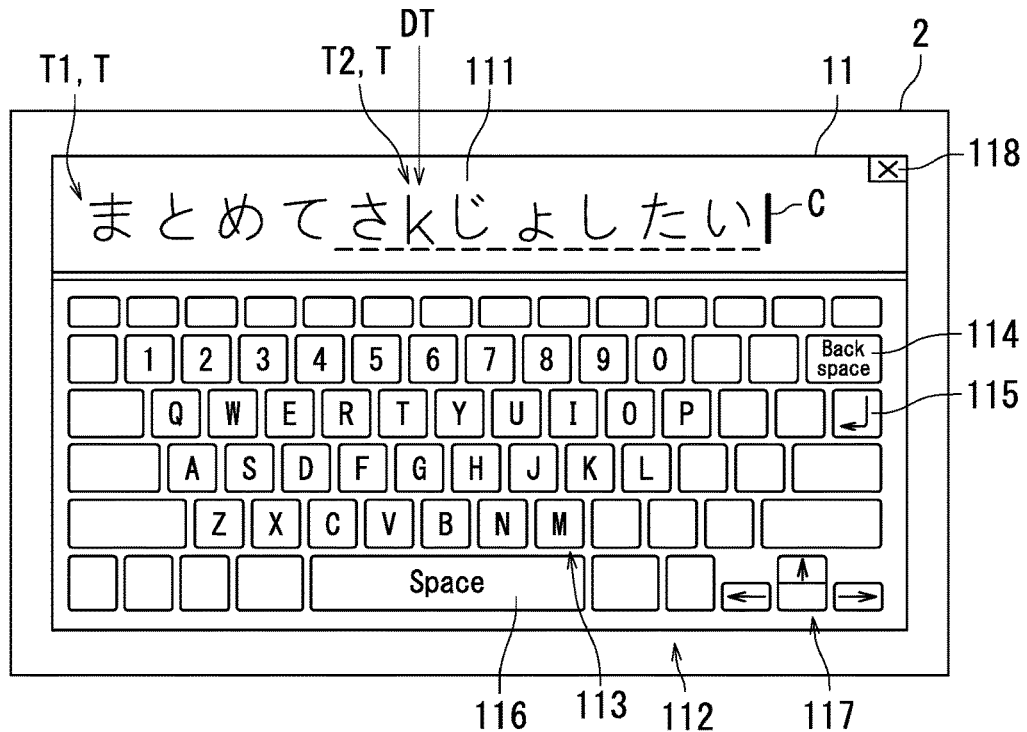
FIG. 9A is a diagram illustrating another example of the character input screen according to the first embodiment of the present disclosure.
Figure 9B:
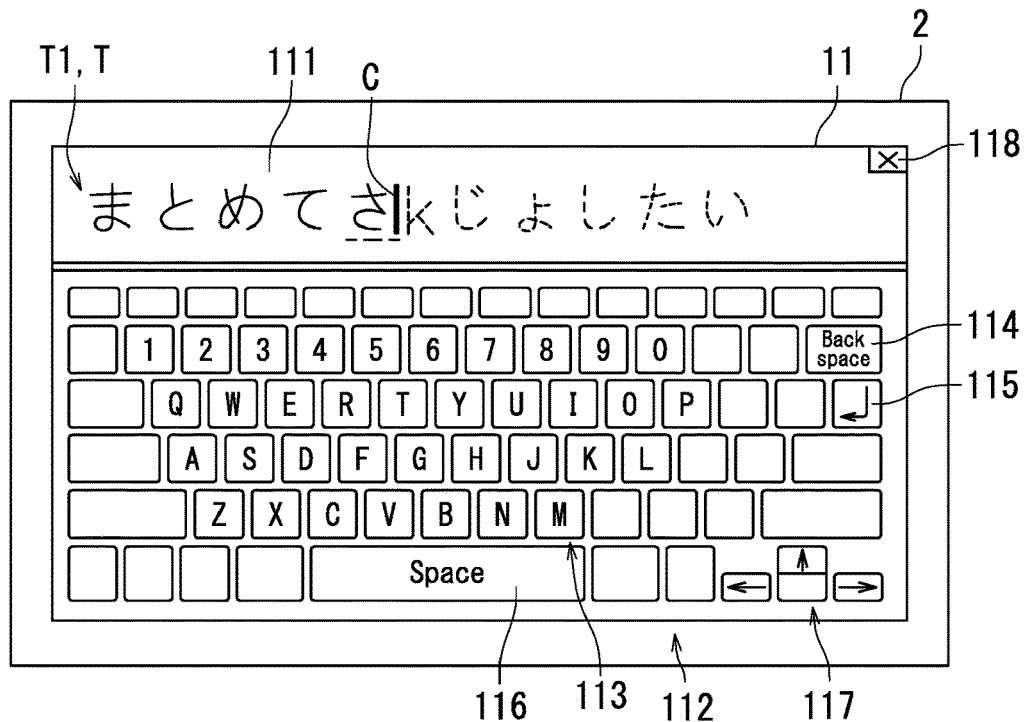
FIG. 9B is a diagram illustrating the character input screen displayed after the character delete key has been pressed in a state illustrated in FIG. 9A.

The following describes with reference to FIGS. 1, 9A, and 9B, the character input control processing executed when the Roman character input mode is selected as the character input mode. That is, in an example illustrated in FIGS. 9A and 9B, the controller 5 refers to the Japanese word table 311.

FIG. 9A is a diagram illustrating another example of the character input screen 11 according to the first embodiment. Specifically, FIG. 9A illustrates the character input screen 11 displayed when character input keys 113 corresponding to the alphabetic characters "m", "a", "t", "o", "m", "e", "t", and "e" have been pressed in the Roman character input mode, then the confirmation key 115 has been pressed, and thereafter character input keys 113 corresponding to the alphabetic characters "s", "a", "k", "j", "y", "o", "s", "i", "t", "a", and "i" have been pressed. FIG. 9B is a diagram illustrating the character input screen 11 displayed after the character delete key 114 has been pressed in the state illustrated in FIG. 9A. Note that the following description will be made on the assumption that no word predictable from "k" is registered in the Japanese word table 311.

As illustrated in FIG. 9A, plural kana characters T1 "ま", "と", "め", "て", and "さ", an alphabetic character T2 "k", and kana characters T1 "じ", "ょ", "じ", "た", and "い" are displayed in the character display field 111. In the example illustrated in FIG. 9A, input of the four kana characters T1 "ま", "と", "め", and "て" has been confirmed. Input of the kana character T1 "さ", the alphabetic character T2 "k", and the five kana characters T1 "じ", "ょ", "じ", "た", and "い"

has not been confirmed. The cursor C is located at the end of a character string "さkじょしたい" made up of the unconfirmed characters T.

In the example illustrated in FIG. 9A, no word registered in the Japanese word table 311 is predictable from the unconfirmed character T "k". Therefore, the controller 5 stores in the storage 3 the character T "k" as a deletion start character DT.

When the character delete key 114 is pressed in the state illustrated in FIG. 9A, the controller 5 deletes the deletion start character DT and all the unconfirmed characters T following the deletion start character DT. Therefore, as indicated by dash lines in FIG. 9B, the alphabetic character "k" and the five kana characters T1 "じ", "ょ", "じ", "た", and "い" following the alphabetic character "k" are deleted.

Second Embodiment

The following describes a second embodiment with reference to FIGS. 1 and 10 to 16. The second embodiment differs from the first embodiment in that the controller 5 has plural deletion modes and selects one of the deletion modes. The second embodiment will be described about matters different from the first embodiment and description of the same matters as those described in the first embodiment will be omitted. A user can select a deletion mode from first through fourth deletion modes displayed on a deletion mode selection screen 12.

Figure 10:
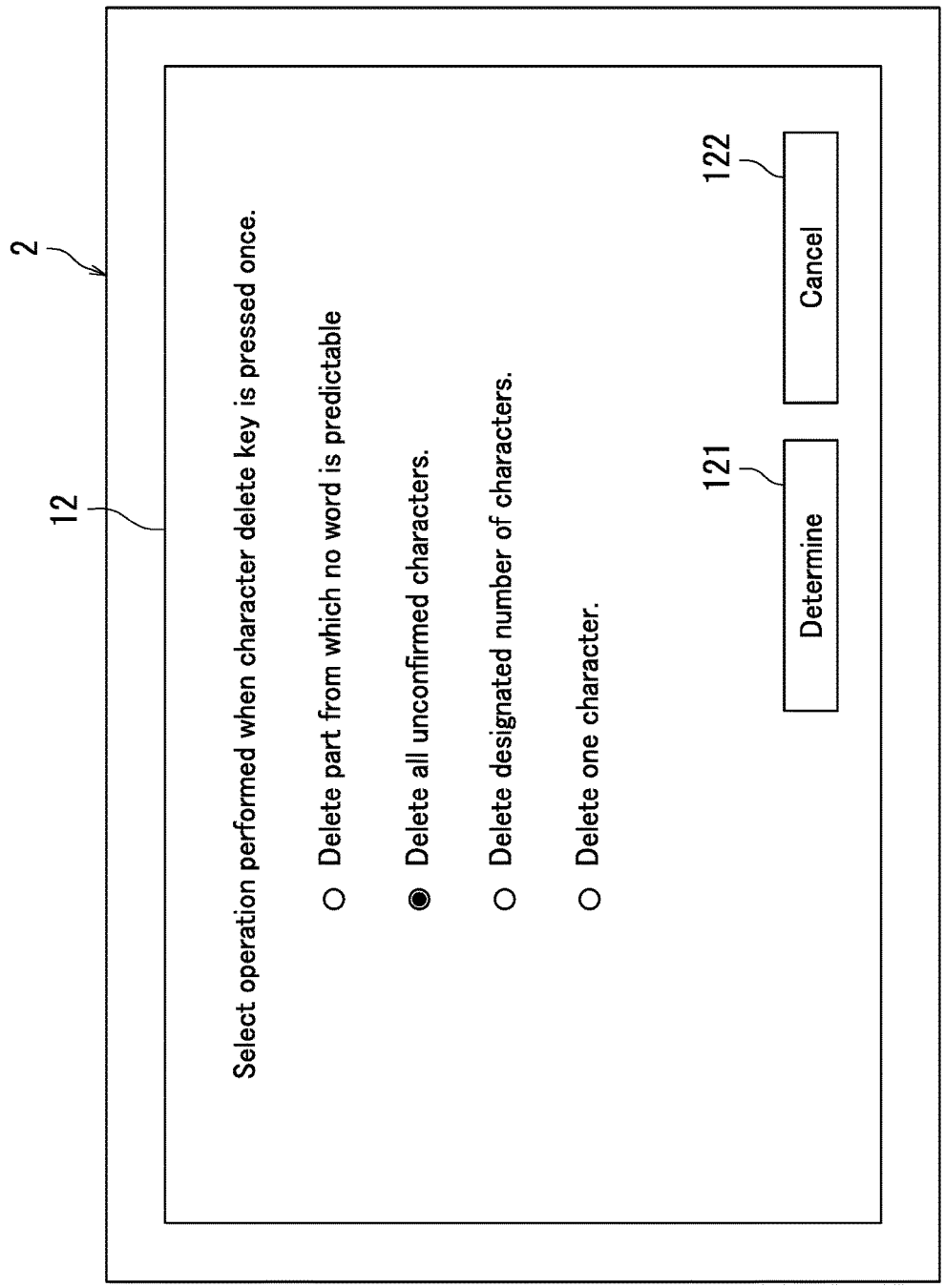
FIG. 10 is a diagram illustrating an example of a deletion mode selection screen according to a second embodiment of the present disclosure.

The deletion mode selection screen 12 according to the second embodiment will be described with reference to FIG. 10. FIG. 10 is a diagram illustrating an example of the deletion mode selection screen 12 according to the second embodiment.

As illustrated in FIG. 10, the controller 5 causes the deletion mode selection screen 12 to be displayed on the touch panel 2. The first through fourth deletion modes that are each selectable are displayed on the deletion mode selection screen 12. In the present embodiment, the first deletion mode is selected when "Delete part from which no word is predictable." is designated. The second deletion mode is selected when "Delete all unconfirmed characters." is designated. The third deletion mode is selected when "Delete designated number of characters." is designated. The fourth deletion mode is selected when "Delete one character." is designated. In the example illustrated in FIG. 10, the second deletion mode "Delete all unconfirmed characters." is designated.

A determination key 121 and a cancel key 122 are also displayed on the deletion mode selection screen 12. Upon detecting the determination key 121 being pressed, the controller 5 selects a designated deletion mode as a current deletion mode. The controller 5 stores in the storage 3 the selected current deletion mode and ends display of the deletion mode selection screen 12. The controller 5 also ends display of the deletion mode selection screen 12 upon detecting the cancel key 122 being pressed.

When the character delete key 114 is pressed in the present embodiment, the controller 5 refers to the current deletion mode stored in the storage 3 and executes the character deletion processing (any of first through fourth deletion processing) in the current deletion mode.

Next, the following describes with reference to FIGS. 1, 11A, 11B, and 12 the character deletion processing executed when the second deletion mode is selected (when "Delete all unconfirmed characters." described above with reference to FIG. 10 is designated). In the following description, the character deletion processing in the second deletion mode may be referred to as the "second deletion processing".

Figure 11A:
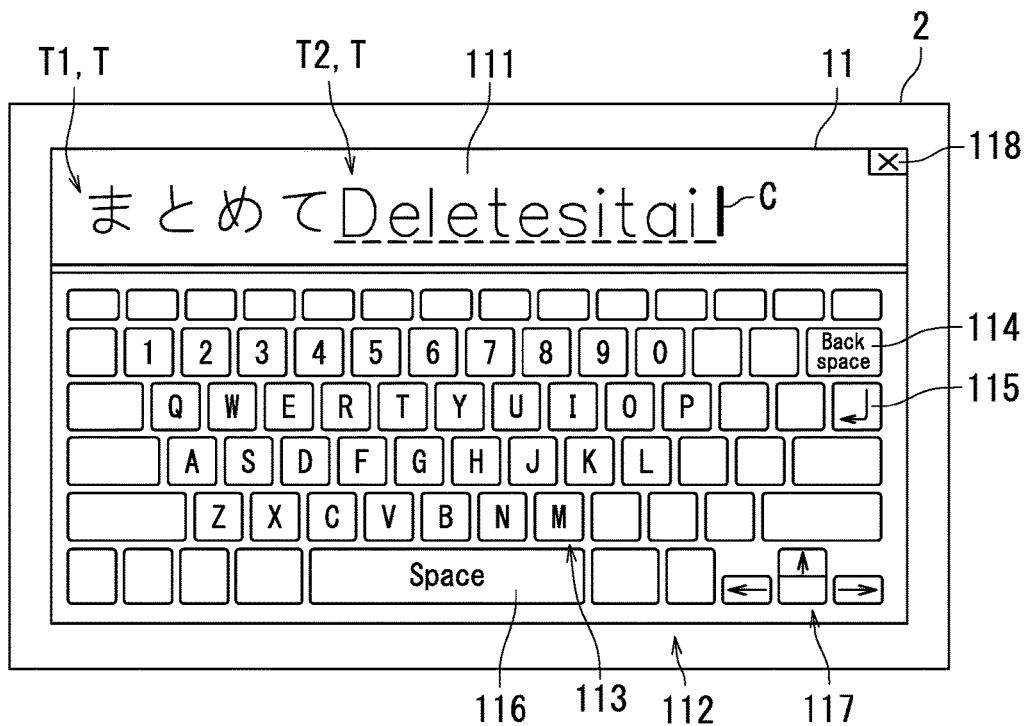
FIG. 11A is a diagram illustrating an example of the character input screen according to the second embodiment of the present disclosure.
Figure 11B:
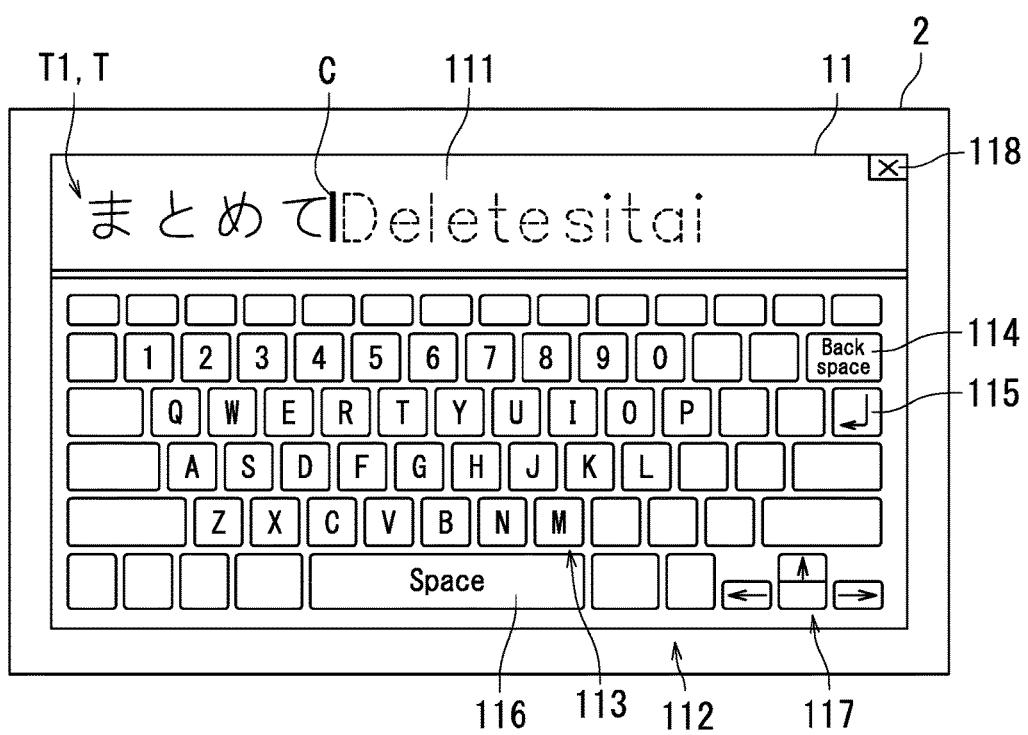
FIG. 11B is a diagram illustrating the character input screen displayed after the character delete key has been pressed in a state illustrated in FIG. 11A.

FIG. 11A is a diagram illustrating an example of the character input screen 11 according to the second embodiment. FIG. 11B is a diagram illustrating the character input screen 11 displayed after the character delete key 114 has been pressed in the state illustrated in FIG. 11A. Specifically, FIG. 11B illustrates the character input screen 11 displayed after the character delete key 114 has been pressed in the second deletion mode.

As illustrated in FIG. 11A, four kana characters T1 "ま", "と", "め", and "て" and plural alphabetic characters T2 "D", "e", "l", "e", "t", "e", "s", "i", "t", "a", and "i" are displayed in the character display field 111. In the example illustrated in FIG. 11A, input of the four kana characters T1 "ま", "と", "め", and "て" has been confirmed and input of the plural alphabetic characters T2 "D", "e", "l", "e", "t", "e", "s", "i", "t", "a", and "i" has not been confirmed. The cursor C is located at the end of a character string "Deletesitai" made up of the plural unconfirmed characters T.

When the character delete key 114 is pressed, the controller 5 acquires the position of the cursor C. In the second deletion processing, the controller 5 determines whether or not the cursor is located in an unconfirmed area. Upon determining that the cursor C is located in an unconfirmed area, the controller 5 deletes all unconfirmed characters T. Therefore, as indicated by dash lines in FIG. 11B, all the unconfirmed characters T "D", "e", "l", "e", "t", "e", "s", "i", "t", "a", and "i" are deleted.

Figure 12:
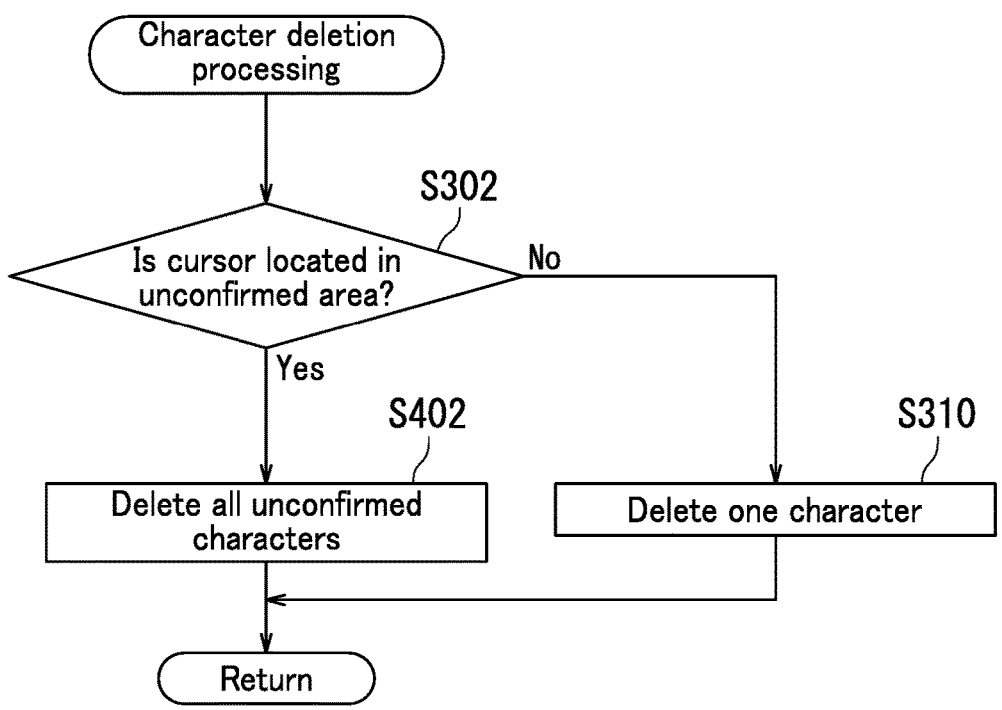
FIG. 12 is a flowchart illustrating character deletion processing according to the second embodiment of the present disclosure.

FIG. 12 is a flowchart illustrating the character deletion processing according to the second embodiment. Specifically, FIG. 12 illustrates the character deletion processing in the second deletion mode. The character deletion processing is started when the controller 5 detects the character delete key 114 being pressed.

As illustrated in FIG. 12, when the controller 5 determines that the cursor C is located in an unconfirmed area (step S302: Yes), all unconfirmed characters T are deleted (step S402). Through the above, the controller 5 ends the character deletion processing and returns to step S102 in FIG. 3. By contrast, when the controller 5 determines that the cursor C is not located in an unconfirmed area (step S302: No), from among at least one character T displayed in the character display field 111, a character immediately preceding the cursor C is deleted (step S310). Through the above, the controller 5 ends the character deletion processing and returns to step S102 in FIG. 3.

Next, the following describes with reference to FIGS. 1 and 13 to 15 the character deletion processing executed when the third deletion mode is selected (when "Delete designated number of characters." described above with reference to FIG. 10 is designated). In the following description, the character deletion processing in the third deletion mode may be referred to as the "third deletion processing".

Figure 13:
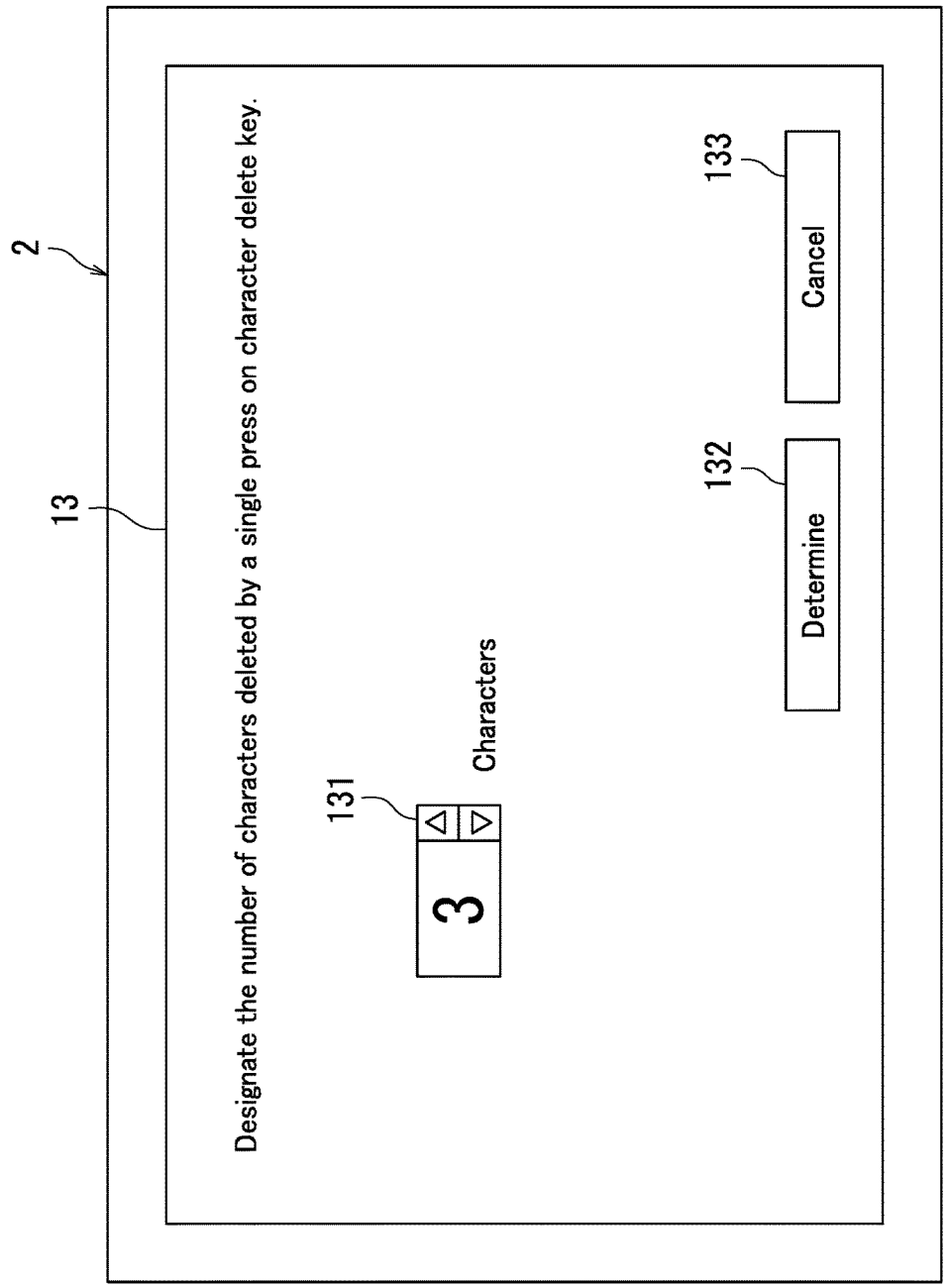
FIG. 13 is a diagram illustrating a character-deletion-number designation screen according to the second embodiment of the present disclosure.

FIG. 13 is a diagram illustrating a character-deletion-number designation screen 13 according to the second embodiment. When "Delete designated number of characters." has been designated and the determination key 121 has been pressed in the deletion mode selection screen 12 described above with reference to FIG. 10, the controller 5 causes the character-deletion-number designation screen 13 to be displayed on the touch panel 2 as illustrated in FIG. 13. The number of characters to be deleted in response to a single press on the character delete key 114 can be designated through the character-deletion-number designation screen 13.

As illustrated in FIG. 13, the character-deletion-number designation screen 13 includes a list box 131, a determination key 132, and a cancel key 133. A number is displayed in the list box 131. "3" is displayed in the example illustrated in FIG. 13. The number displayed in the list box 131 increases or decreases in response to an operation by a user on the list box 131.

Upon detecting the determination key 132 being pressed, the controller 5 stores in the storage 3 the number displayed in the list box 131 as the number of characters to be deleted and ends display of the character-deletion-number designation screen 13. The controller 5 also ends display of the character-deletion-number designation screen 13 upon detecting the cancel key 133 being pressed.

Figure 14:
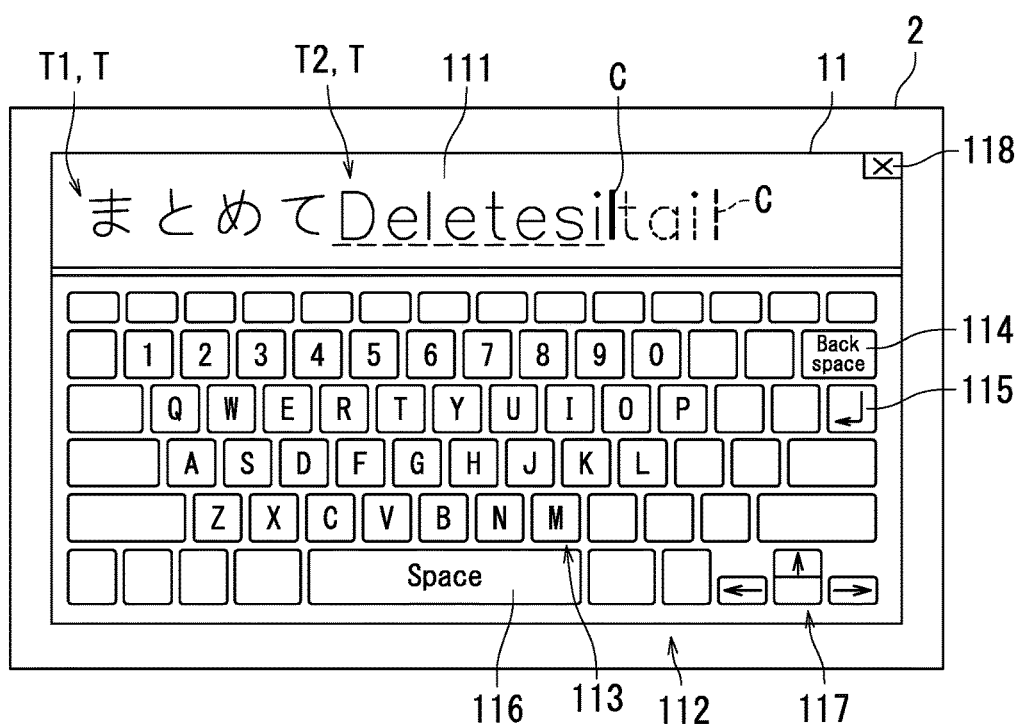
FIG. 14 is a diagram illustrating another example of the character input screen displayed after the character delete key has been pressed in the state illustrated in FIG. 11A.

FIG. 14 is a diagram illustrating another example of the character input screen 11 displayed after the character delete key 114 has been pressed in the state illustrated in FIG. 11A. Specifically, FIG. 14 illustrates the character input screen 11 displayed after the character delete key 114 has been pressed in the third deletion mode. The example illustrated in FIG. 14 will be described on the assumption that "3" is stored in the storage 3 as the number of characters to be deleted.

When the character delete key 114 is pressed in the state illustrated in FIG. 11A, the controller 5 reads from the storage 3 the number of characters to be deleted. Also, the controller 5 acquires a position of the cursor C. After reading the number of characters to be deleted and acquiring the position of the cursor C, the controller 5 deletes the read number of characters T immediately preceding the cursor C. Therefore, as indicated by dash lines in FIG. 14, three unconfirmed characters T "t", "a", and "i" immediately preceding the cursor C are deleted. Note that in the third deletion mode, three characters T immediately preceding the cursor C can be deleted regardless of whether or not the cursor C is located in an unconfirmed area.

Figure 15:
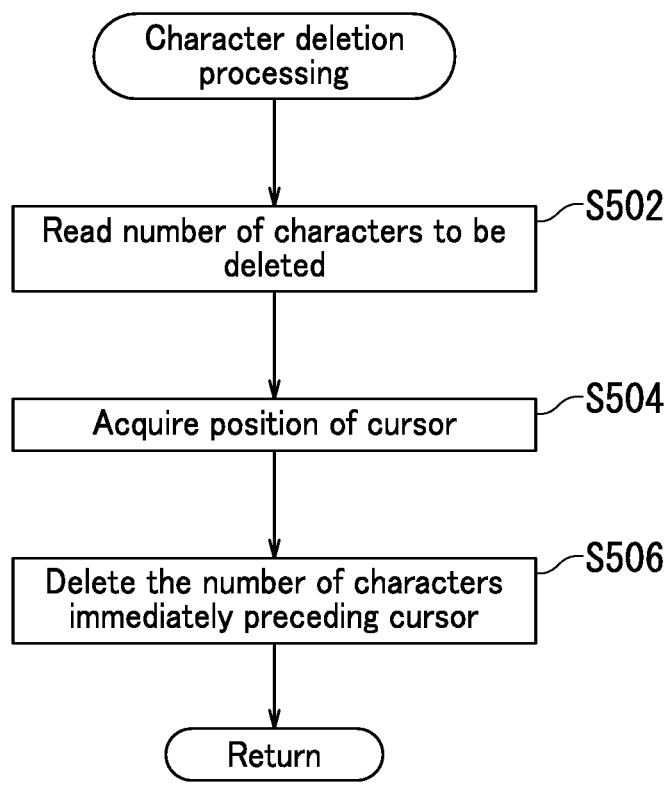
FIG. 15 is a flowchart illustrating another example of the character deletion processing according to the second embodiment of the present disclosure.

FIG. 15 is a flowchart illustrating another example of the character deletion processing according to the second embodiment. Specifically, FIG. 15 illustrates the character deletion processing in the third deletion mode. The character deletion processing is started when the controller 5 detects the character delete key 114 being pressed.

As illustrated in FIG. 15, the controller 5 reads from the storage 3 the number of characters to be deleted (step S502). Next, the controller 5 acquires a position of the cursor C (step S504). Next, the controller 5 deletes the read number of characters T immediately preceding the cursor C (step S506). Through the above, the controller 5 ends the character deletion processing and returns to step S102 in FIG. 3. Note that the order of step S502 and step S504 can be reversed.

Figure 16:
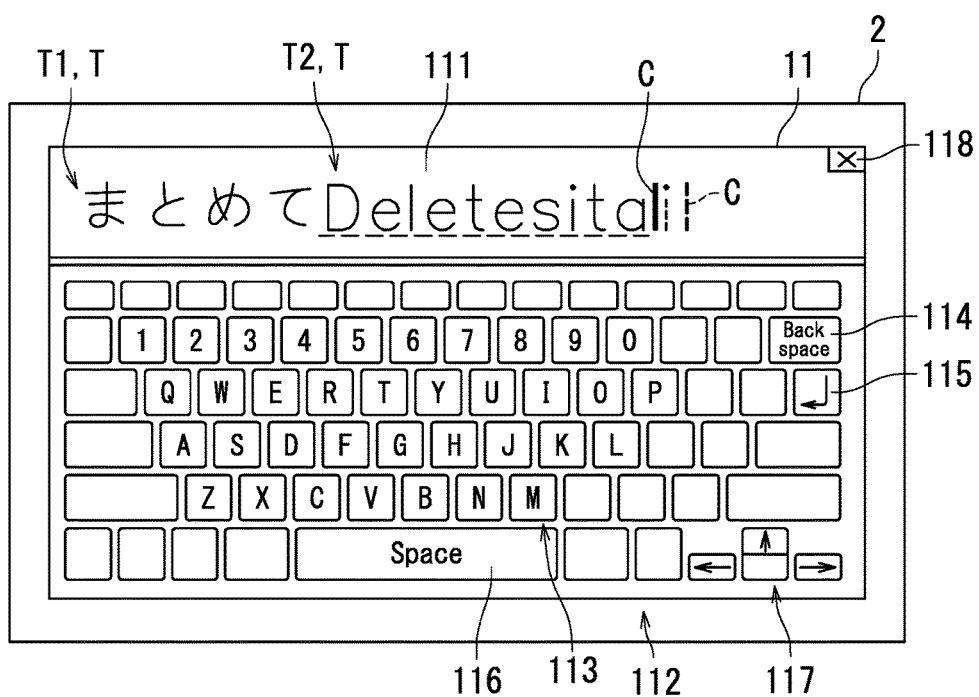
FIG. 16 is a diagram illustrating a further example of the character input screen displayed after the character delete key has been pressed in the state illustrated in FIG. 11A.

Next, the following describes with reference to FIG. 16 the character deletion processing executed when the fourth deletion mode is selected (when "Delete one character." described above with reference to FIG. 10 is designated). In the following description, the character deletion processing in the fourth deletion mode may be referred to as the "fourth deletion processing".

FIG. 16 is a diagram illustrating another example of the character input screen 11 displayed after the character delete key 114 has been pressed in the state illustrated in FIG. 11A. Specifically, FIG. 16 illustrates the character input screen 11 displayed after the character delete key 114 has been pressed in the fourth deletion mode.

When the character delete key 114 is pressed in the state illustrated in FIG. 11A, the controller 5 deletes, from among the characters T displayed in the character display field 111, a character T immediately preceding the cursor C. Therefore, as indicated by a dash line in FIG. 16, the alphabetic character T2 "i" immediately preceding the cursor C is deleted.

Through the above, the second embodiment has been described. According to the present embodiment, the controller 5 has the first deletion mode, the second deletion mode, the third deletion mode, and the fourth deletion mode. A user can select any of the first through fourth deletion modes through the deletion mode selection screen 12. Therefore, a character or characters that the user wants to delete can be deleted efficiently.

Note that although the present embodiment has been described about an example in which a user designates the number of characters to be deleted, the number of characters to be deleted may be an unchangeable number stored in the storage 3 in advance.

Through the above, the embodiments of the present disclosure have been described with reference to the drawings (FIGS. 1 to 16). However, the present disclosure is not limited to the above-described embodiments and is practicable in various manners within a scope not departing from the gist of the present disclosure.

For example, the present disclosure is not limited to the above-described embodiments in which the input device is the touch sensor 22. The input device may be a keyboard or the like.

Also, at step S310 (see FIGS. 8 and 12) of the above-described embodiments of the present disclosure, a character immediately preceding the cursor C is deleted.

However, for example plural characters T immediately preceding the cursor C may be deleted at step S310. The number of characters to be deleted may be an unchangeable number stored in the storage 3 in advance or may be designated by a user.

Further, although the character delete key 114 in the above-described embodiments of the present disclosure is the "Back space key", the character delete key 114 is not limited to the "Back space key". The character delete key 114 may be a "Delete key". In this case, a character or characters T located in the rear of the cursor C is/are deleted.

Although in the above-described embodiments, the present disclosure is applied to the portable information terminal device, the present disclosure is also applicable to an electronic device such as a personal computer.

What is claimed is:

1. A character input control method comprising:
   detecting a character input key being pressed, and in response to the detection of a character input key being pressed, displaying a character corresponding to the character input key at a position of a cursor displayed on a character input screen;
   selecting a deletion mode; and
   detecting a single press on a character delete key, and in response to detecting a single press on a character delete key, deleting at least one character displayed on the character input screen,
   wherein the displaying a character corresponding to the character input key includes:
      upon detecting the character input key being pressed, displaying the character corresponding to the character input key as an unconfirmed character on the character input screen, the unconfirmed character being a character input of which is to be confirmed when a confirmation key is pressed;
      acquiring and unconfirmed character or a character string of unconfirmed characters displayed on the character input screen;

determining that the unconfirmed character or the character string is not a candidate for any word registered in the word table; and in response to determining that the unconfirmed character or the character string is not a candidate for any word registered in the word table, acquiring a character input through a character input key just before the determination and storing in storage an unconfirmed character that makes word prediction impossible the acquired character as a deletion start character, the deleting at least one character includes:

deleting the at least one character in a first deletion mode in which the deletion start character is deleted or the deletion start character and at least one unconfirmed character immediately preceding or following the deletion start character are deleted;

deleting the at least one character in a second deletion mode in which all unconfirmed characters are deleted;

deleting the at least one character in a third deletion mode in which a designated number of characters immediately preceding or following the cursor are deleted; and deleting the at least one character in a fourth deletion mode in which only one character immediately preceding or following the cursor is deleted, and the selecting a deletion mode includes selecting one of the first through fourth deletion modes.

2. The character input control method according to claim 1, wherein
in the first deletion mode, the deletion start character and at least one unconfirmed character following the deletion start character are deleted.

3. The character input control method according to claim 2, wherein
in the first deletion mode, all unconfirmed characters following the deletion start character are deleted.

4. The character input control method according to claim 1, wherein
in the first deletion mode, the deletion start character and at least one unconfirmed character interposed between the deletion start character and the cursor are deleted.

5. The character input control method according to claim 1, wherein
the selecting a deletion mode includes:
displaying a deletion mode selection screen for selecting one of the first through fourth deletion modes as the deletion mode; and
upon any of the first through fourth deletion modes being selected by a user through the deletion mode selection screen, storing the selected deletion mode as a current deletion mode in the storage.

6. The character input control method according to claim 1, wherein
the selecting a deletion mode includes:
upon the third deletion mode being selected, displaying a character-deletion-number designation screen for designating the number of characters to be deleted in response to the single press on the character delete key; and
storing the number of characters designated through the character-deletion-number designation screen in the storage.

7. A non-transitory computer readable storage medium storing therein a character input control program to be executed by a computer to perform the character input control method according to claim 1.

8. An electronic device comprising:
a display configured to display a character input screen;
an input device including operation keys;
storage storing therein a word table in which a plurality of words are registered; and
a controller configured to detect each of the operation keys being pressed, wherein
at least one character and a cursor are displayed on the character input screen,
the operation keys include character input keys, a character delete key for deleting any of the at least one character, and a confirmation key for confirming input of the at least one character, each of the at least one character being input through one of the character input keys,
when the controller detects any of the character input keys being pressed, the controller causes a character corresponding to the pressed character input key to be displayed as an unconfirmed character on the character input screen, the unconfirmed character being a character input of which is to be confirmed when the confirmation key is pressed, and
the controller determines whether or not an unconfirmed character or a character string of unconfirmed characters that is displayed on the character input screen is a candidate for any word registered in the word table,
when determining that the unconfirmed character or the character string of the unconfirmed characters is not a candidate for any word registered in the word table, the controller acquires a character input through one of the character input keys just before the determination,
the controller stores in the storage the acquired character as a deletion start character,
the controller has a first deletion mode, a second deletion mode, a third deletion mode, and a fourth deletion mode, each as a deletion mode in which at least one character displayed on the character input screen is deleted in response to a single press on the character delete key,
in the first deletion mode, the controller deletes the deletion start character, or the deletion start character and at least one unconfirmed character immediately preceding or following the deletion start character,
in the second deletion mode, the controller deletes all unconfirmed characters,
in the third deletion mode, the controller deletes a designated number of characters immediately preceding or following the cursor,
in the fourth deletion mode, the controller deletes only one character immediately preceding or following the cursor, and
the controller selects one of the first through fourth deletion modes.

9. The electronic device according to claim 8, wherein
in the first deletion mode, the controller deletes the deletion start character and at least one unconfirmed character following the deletion start character.

10. The electronic device according to claim 9, wherein
the controller deletes all unconfirmed characters following the deletion start character.

11. The electronic device according to claim 8, wherein
in the first deletion mode, the controller deletes the deletion start character and at least one unconfirmed character interposed between the deletion start character and the cursor.

12. The electronic device according to claim 8, wherein
the controller causes the display to display a deletion mode selection screen for selecting one of the first through fourth deletion modes as the deletion mode, and
upon any of the first through fourth deletion modes being selected by a user through the deletion mode selection screen, the controller stores the selected deletion mode as a current deletion mode in the storage.

13. The electronic device according to claim 8, wherein
upon the third deletion mode being selected, the controller causes the display to display a character-deletion-number designation screen for designating the number of characters to be deleted in response to the single press on the character delete key, and
the controller stores the number of characters designated through the character-deletion-number designation screen in the storage.

14. The electronic device according to claim 8, wherein
upon the character delete key being pressed, the controller acquires a position of the cursor and determines whether or not the position of the cursor is located in an area in which the unconfirmed character or the character string of the unconfirmed characters is displayed.

15. The electronic device according to claim 14, wherein
when determining that the position of the cursor is located in the area in which the unconfirmed character or the character string of the unconfirmed characters is displayed, the controller determines whether or not the cursor is located in the rear of the deletion start character, and
when determining that the cursor is located in the rear of the deletion start character, the controller deletes the deletion start character and all unconfirmed characters following the deletion start character.

* * * * *